H. W. FLETCHER.
PROCESS OF MAKING BEARINGS.
APPLICATION FILED SEPT. 13, 1920.
1,399,856.
Patented Dec. 13, 1921.
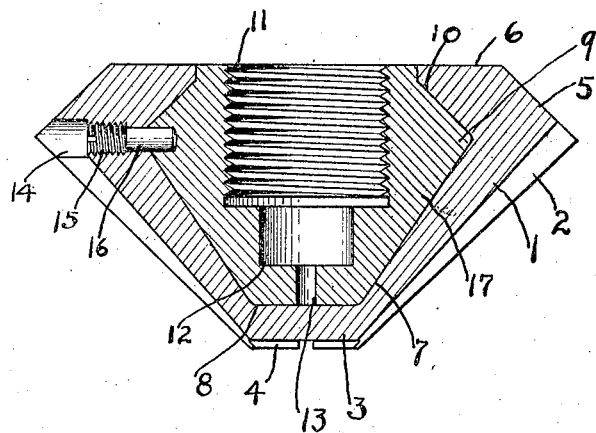
H.W. FLETCHER - INVENTOR.
BY Jesse R. Stone
ATTORNEY.

UNITED STATES PATENT OFFICE.

HAROLD W. FLETCHER, OF HOUSTON, TEXAS, ASSIGNOR TO HUGHES TOOL COMPANY, OF HOUSTON, TEXAS, A CORPORATION OF TEXAS.

PROCESS OF MAKING BEARINGS.

1,399,856.      Specification of Letters Patent.      Patented Dec. 13, 1921.

Application filed September 13, 1920. Serial No. 410,038.

*To all whom it may concern:*

Be it known that I, HAROLD W. FLETCHER, a citizen of the United States, residing at Houston, Harris county, Texas, have invented a certain new and useful Improvement in Processes of Making Bearings, of which the following is a full, clear, and exact descriptoin, such as will enable others skilled in the art to which it appertains to make and use the same. .

My invention relates to an improvement in bearings and the process by which the same may be formed on the interior of rotary members in such manner that the said bearing may not be again moved. It has particular application to the forming of bearings within rotary cutters to be used on earth boring drills intended for operation in rock and other hard material.

It is sometimes desirable, where bearings are formed in recesses within rotary tools, to secure the same in position so that they may not be easily removed. This is especially the case in rotary cutters operating in deep wells, where the accidental removal of the cutters from their bearings must be provided against.

An object of my invention is to provide a bearing for rotary cutters, or the like, which may be formed in one integral piece and so shaped as to make its removal from the interior of the cutter impossible.

Another object is to provide a process of forming such a bearing within its seat by means of which process said bearing may be rapidly and cheaply made.

Other objects and advantages of my invention will more clearly appear in the description which follows.

In the drawing I have shown a central longitudinal section through a cutter to be used upon an earth boring drill such as is disclosed in the patent to Hughes, No. 1,010,406. This cutter is somewhat frusto-conical in shape, having a tapered forward cutting face 1, with longitudinal teeth 2 thereon, and a truncated forward end 3 having transverse grooves 4 therein which act as teeth to disintegrate material at the end of the said cutter. The inner enlarged end of the frusto-conical cutter is beveled inwardly at 5, to form an oppositely tapered surface joining with the inner face 6 of the cuttr which is flattened to bear against the head of the bit, upon which it is to be used.

This cutter is formed with a frusto-conical shaped recess 7 therein having a flat forward end 8 and tapered sides, corresponding in shape to that of the cutter itself. By this provision the point of largest diameter of the bearing face is formed within the cutter at a point spaced from the inner end of said bearing at 9. The cutter thus forms a shoulder 10 which prevents the removal of the bearing from its seat within the cutter when it has been properly formed therein. The bearing has a cylindrical threaded attaching seat 11 centrally therein, said seat being somewhat over one-half the length of said bearing. At the end of the threaded seat, the inner bore is decreased in diameter at 12 to form a smooth recess to receive the end of the pin or stud, upon which the cutter is to be mounted. An oil duct or channel 13 extends from the end of the recesses 12 downwardly through the bearing to the interior surface of the cutter.

To prevent the rotation of the cutter upon the bearing at certain times, as when the cutter is being screwed upon the pin or stud of the bit, there is provided an opening 14 at some point upon the circumference of largest diameter of the cutter, said opening being threaded at 15 to receive the head of a pin 16, formed to fit therein. The end of the pin 16 projects inwardly from the cutter into a recess within the bearing.

The method by which the bearing 17 is formed within the cutter, as shown in the the drawing, will now be described. A process of die-casting is used for this purpose. In the use of this process a die-casting machine, having a mandrel thereon shaped approximately to fit within the stepped recess 11, 12 within the bearing shown in the drawing is employed. Said mandrel is, however, somewhat smaller than this recess and tapered toward the point so that it may be readily withdrawn. This mandrel has an opening in the end thereof and when placed in central position with the cutter 1, molten metal suitable for bearing purposes is forced through the mandrel under high pressure until the space outside said mandrel and within the central recess within the cutter has been completely filled with molten metal, the metal used is preferably bronze, but other suitable material may be employed. When the central bearing has thus been cast the metal is allowed to harden in place and the mandrel is withdrawn, leaving a central recess which is then counter bored to the proper size and threaded to form the seat 11, and the lower portion 12 of the recess is machined out to the proper size, as shown. The oil channel 13 is then bored downwardly to the inner face of the cutter so as to provide a passage for lubricant therethrough.

In the forming of this bearing in the manner described, the bronze metal of the bearing will project from the bearing face 10 of the cutter and it will be necessary to smooth and machine down this face into proper alinement with the face of the cutter.

The pin 16 will be in position while the said bearing is being cast and when the said bearing has hardened the pin may be unscrewed and withdrawn so that it will be possible to rotate the bearing relative to the cutter. I then contemplate screwing the cutter upon a stud adapted to fit within the threaded recess 11, 12, and to exert pressure against the cutter which may then be rotated relative to the bearing. Oil or other lubricant will then be forced downwardly through the channel 13 in the stud on which the cutter is mounted into the recess within the cutter so as to lubricate the contacting surfaces between the bearing and the cutter. The rotation of the bearing will then serve to burnish the contacting faces of both the bearing and cutter until a smooth rotation of the parts will be possible. The cutter will then be ready for use.

As an alternative means of forming the bearing within the recess of the cutter, I contemplate using a press-forging apparatus. In this operation I use a plug of metal of the proper consistency for bearings, such as brass or bronze, and heat the same to a high temperature so that the same may be in a semi-fluid state. This plug of metal is adapted to fit within the opening in the cutter and to sit within the central bearing recess. I then use a mandrel or punch, shaped somewhat as is the mandrel in my former process, and by driving the same firmly down upon the plug, I form a tapered recess within the plug and expand the said plug laterally so as to completely fill the bearing recess within the cutter. The mandrel or punch, being somewhat tapered in formation, may then be withdrawn and the metal allowed to cool. The process of finishing the bearing, by machining the openings 11 and 12 therein and drilling the oil duct 13, will be performed as previously described, after which the bearing will be burnished and the cutter will be ready for use. This process is in some situations even more desirable than the one first described, but it is not so apt to form an accurate and solid bearing for the cutter. It is understood, however, that either of these methods of forming an integral bearing within the cutter falls within the scope of my invention.

The advantages of a bearing thus formed will be obvious. The bearing may not be removed from the cutter and there will be no danger of parting of the cutters from the bearing as now may take place with the attaching means employed in securing the cutter upon the bearing. Furthermore, it will not be possible for the unskilled workman in the oil fields to remove or change the parts from the desired position.

Bearings may thus be formed within cutters in large quantities very cheaply and quickly and a smooth accurate fit of the bearing within the cutter is assured at all times. The process will thus be cheap and economical to operate and will result in a bearing which is free from accidental removal when in operation.

Having thus described my invention, what I claim as new and desire to protect by Letters Patent is:

1. A process of forming a bearing within a rotary member comprising placing a tapered mandrel centrally within the bearing space, forcing molten metal into said space to completely fill the same, withdrawing said mandrel and machining an attaching recess within said bearing.

2. A process of forming a bearing within a rotary member having a bearing recess therein comprising placing a hollow mandrel centrally within said recess, forcing molten metal through said mandrel to completely fill said recess about said mandrel, withdrawing said mandrel, machining an attaching seat in the recess left by said mandrel, boring a channel for lubricant through said bearing and rotating said member on said bearing to burnish the contacting rotary bearing surfaces.

3. A process of forming a bearing within a rotary member having a bearing recess therein, comprising forcing molten metal into said bearing recess to form a bearing, machining an attaching seat centrally in said bearing, forcing lubricant between the contacting faces of said bearing and said rotary member and rotating said rotary member on said bearing under pressure to burnish the same in the manner described.

4. A process of forming a bearing within a rotary member having a bearing recess therein, comprising forcing metal under pressure into said recess to form a bearing, machining a recess in said bearing to receive a supporting pin, attaching said bearing to its support and rotating said rotary member on said bearing to burnish the surface thereof.

5. A process of forming a bearing within a rotary member having a bearing recess therein, comprising forcing metal under pressure into said recess to form a bearing, forming a seat in said bearing for a supporting pin, and rotating said rotary member on said bearing, to burnish said bearing.

6. A process of forming a bearing within a rotary member having a bearing recess therein, comprising forcing metal under pressure into said recess to completely fill the same, machining an attaching seat within said metal, and forming a lubricating duct from said seat to the inner face of said recess.

In testimony whereof I hereunto affix my signature this the 8th day of September, A. D. 1920.

HAROLD W. FLETCHER.